(12) United States Patent
Iseki et al.

(10) Patent No.: US 8,491,714 B2
(45) Date of Patent: Jul. 23, 2013

(54) INK COMPOSITION

(75) Inventors: Hiromi Iseki, Shiojiri (JP); Yasuhiro Oki, Matsumoto (JP); Kazuhiko Kitamura, Matsumoto (JP)

(73) Assignee: SEiko Epson Corporation, Toyko (JP)

( * ) Notice: Subject to any disclaimer, the term of this patent is extended or adjusted under 35 U.S.C. 154(b) by 307 days.

(21) Appl. No.: 13/053,693

(22) Filed: Mar. 22, 2011

(65) Prior Publication Data
US 2011/0232525 A1    Sep. 29, 2011

(30) Foreign Application Priority Data

Mar. 23, 2010   (JP) ................................. 2010-066819

(51) Int. Cl.
C09D 11/02      (2006.01)

(52) U.S. Cl.
USPC ..................................................... 106/31.47

(58) Field of Classification Search
USPC ..................................................... 106/31.47
See application file for complete search history.

(56) References Cited

U.S. PATENT DOCUMENTS

| | | | |
|---|---|---|---|
| 5,428,383 A * | 6/1995 | Shields et al. | 106/31.27 |
| 6,059,868 A * | 5/2000 | Kasperchik | 106/31.27 |
| 6,454,844 B1 | 9/2002 | Kanaya | |
| 6,605,142 B1 * | 8/2003 | Kenworthy et al. | 106/31.27 |
| 6,616,273 B1 * | 9/2003 | Bruinsma | 347/100 |
| 6,761,759 B2 * | 7/2004 | Oki et al. | 106/31.47 |
| 6,852,154 B2 * | 2/2005 | Kitamura et al. | 106/31.47 |
| 7,109,336 B2 | 9/2006 | Fujiwara et al. | |
| 7,296,885 B2 * | 11/2007 | Doi | 106/31.58 |
| 7,323,045 B2 | 1/2008 | Hanmura et al. | |
| 7,375,147 B2 * | 5/2008 | Suzuki et al. | 106/31.27 |

FOREIGN PATENT DOCUMENTS

| | | |
|---|---|---|
| JP | 2000-290559 A | 10/2000 |
| JP | 2001-288392 A | 10/2001 |
| JP | 2002-332419 A | 11/2002 |
| JP | 2002-371079 A | 12/2002 |
| JP | 2005-105136 A | 4/2005 |

\* cited by examiner

*Primary Examiner* — Helene Klemanski
(74) *Attorney, Agent, or Firm* — Nutter McClennen & Fish LLP; John J. Penny, V.

(57) ABSTRACT

An ink composition contains a water-soluble copper compound and an anthrapyridone dye represented by the following formula:

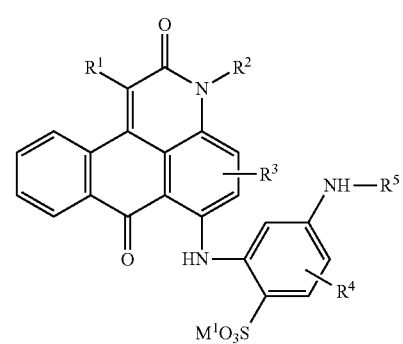

(I)

wherein $M^1$ represents a hydrogen atom, $NH_4$, or Na; $R^1$ represents a hydrogen atom, a substitutable alkyl group, a substitutable aryl group, or a substitutable benzoyl group; $R^2$ represents a hydrogen atom or a substitutable alkyl group; $R^3$ represents a hydrogen atom, a halogen atom, or a substitutable alkyl group; $R^4$ represents a hydrogen atom, $NH_4$ which may be substituted, or a substitutable sulfo group; and $R^5$ represents an acyl group or a group represented by the following formula:

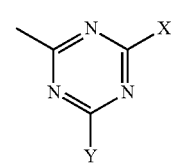

(II)

where X and Y independently represent a chlorine atom, hydroxy group, amino group, monoethanolamino group, diethanolamino group, morpholino group, anilino group, or phenol group in which hydrogen atoms may be substituted by one or more substituents.

10 Claims, No Drawings

INK COMPOSITION

BACKGROUND

1. Technical Field

The present invention relates to ink compositions and particularly relates to an ink composition useful in achieving a recorded image with good light fastness without impairing the hue of a colorant.

2. Related Art

In recent years, records have been obtained in such a manner that color images are formed by ink jet recording using a plurality of color ink compositions. In usual, the color images are formed using three ink compositions, that is, a yellow ink composition, a magenta ink composition, and a cyan ink composition or four ink compositions, that is, the three ink composition and a black ink composition. Alternatively, the color images are formed using six ink compositions, that is, the four ink compositions, a light cyan ink composition, and a light magenta ink composition or seven ink compositions, that is, the six ink compositions and a dark yellow ink composition in some cases.

The ink compositions used to form the color images individually need to have good color developability, combinations of some of the ink compositions need to exhibit good intermediate colors, and records obtained from the ink compositions need to not be discolored during storage.

Improvements have been continually made for heads, ink compositions, recording techniques, and media used to print "photographic quality" images with color ink jet printers; hence, recently obtained images are comparable in level to "silver-halide photographs" and have "photographic quality". Furthermore, attempts have been made to improve the storage stability of obtained images as ink compositions and media are improved. In particular, the obtained images have improved light fastness satisfactory for practical use (see JP-A-2000-290559 and JP-A-2001-288392); however, the obtained images have not been comparable in light fastness to silver-halide photographs. Light fastness is usually evaluated on the basis of the fading rate of a yellow (Y) pattern, magenta (M) pattern, and cyan (C) pattern having an optical density of about 1.0. In the case of evaluating the light fastness of ink compositions loaded into currently commercially available printers by the above evaluation method, the light fastness of magenta ink compositions is lowest; hence, the magenta ink compositions often determine the lifetime of ink sets. Therefore, the improvement of the light fastness of the magenta ink compositions is effective in enhancing the light fastness of photographic images and the lifetime of ink sets.

Prints prepared using the ink compositions are placed not only indoors but also outdoors and therefore are exposed to not only indoor light but also sun light. Thus, there is a need to develop an ink composition having excellent light fastness.

Proposed examples of colorants having excellent light fastness include a compound (an azo dye) disclosed in JP-A-2002-371079 and a compound (an anthrapyridone dye) disclosed in JP-A-2002-332419. A magenta ink composition which contains a combination of two types of colorants and which has excellent light fastness has been proposed (see JP-A-2005-105136). Any ink composition useful in achieving a recorded image with good light fastness without impairing the hue of a colorant has not been known as far as the inventors know.

SUMMARY

The inventors have recently found that an ink composition containing a specific anthrapyridone dye and a water-soluble copper compound is useful in achieving a recorded image with good light fastness without impairing the hue of a colorant. The invention is based on this finding.

An advantage of some aspects of the invention is to provide an ink composition useful in achieving a recorded image with good light fastness without impairing the hue of a colorant.

An ink composition according to an embodiment of the invention contains a water-soluble copper compound and an anthrapyridone dye represented by the following formula:

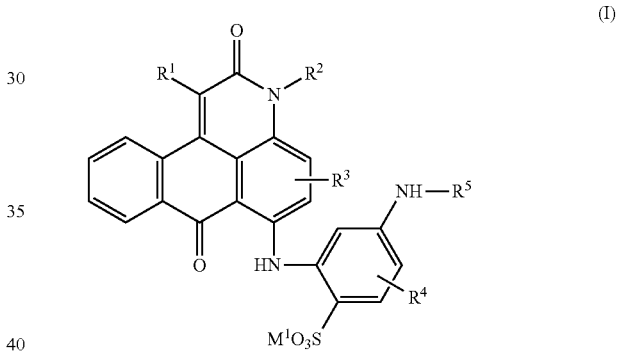

(I)

wherein $M^1$ represents a hydrogen atom, $NH_4$, or Na; $R^1$ represents a hydrogen atom, a substitutable alkyl group, a substitutable aryl group, or a substitutable benzoyl group; $R^2$ represents a hydrogen atom or a substitutable alkyl group; $R^3$ represents a hydrogen atom, a halogen atom, or a substitutable alkyl group; $R^4$ represents a hydrogen atom, $NH_4$ which may be substituted, or a substitutable sulfo group; and $R^5$ represents an acyl group or a group represented by the following formula:

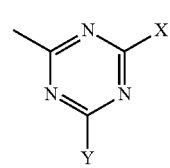

(II)

where X and Y independently represent a chlorine atom, hydroxy group, amino group, monoethanolamino group, diethanolamino group, morpholino group, anilino group, or phenol group in which hydrogen atoms may be substituted by one or more substituents.

According to the invention, an ink composition useful in achieving a recorded image with good light fastness without impairing the hue of a colorant can be provided.

DESCRIPTION OF EXEMPLARY EMBODIMENTS

An ink composition according to an embodiment of the invention contains an anthrapyridone dye represented by Formula (I) and a water-soluble copper compound. The ink composition and components contained in the ink composition will now be described.

Colorant

Anthrapyridone Dye

The ink composition contains the anthrapyridone dye represented by Formula (I).

Preferred examples of the anthrapyridone dye represented by Formula (I) include compounds represented by Formula (I) in which $M^1$ represents $NH_4$ or Na; $R^1$ preferably represents a substitutable benzoyl group and more preferably a benzoyl group substituted by a sulfo group which may be substituted by $NH_4$ or Na; $R^2$ preferably represents a substitutable alkyl group containing one to three carbon atoms and more preferably a methyl group; $R^3$ represents a hydrogen atom; $R^4$ preferably represents a substitutable sulfo group, and more preferably a sulfo group substituted by $NH_4$ or Na; and $R^5$ represents a group represented by Formula (II) in which X and Y preferably independently represent an amino group, an anilino group, or a phenol group and more preferably a phenol group substituted by a carboxyl group which may be substituted by $NH_4$ or Na and hydrogen atoms in these groups may be substituted by one or more substituents.

According to a preferred embodiment of the invention, an ink composition preferably contains an anthrapyridone dye prepared by mixing a compound represented by Formula (I) in which $M^1$ is $NH_4$ and a compound represented by Formula (I) in which $M^1$ is Na. In this ink composition, the content ratio (molar ratio) of the compound represented by Formula (I) in which $M^1$ is $NH_4$ to the compound represented by Formula (I) in which $M^1$ is Na is preferably 6:4 to 8:2 and more preferably 7:3.

A preferred example of the anthrapyridone dye represented by Formula (I) is a compound represented by the following formula:

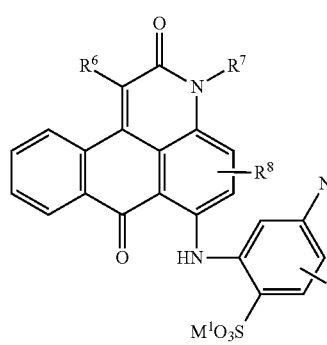

wherein $M^2$ represents a hydrogen atom, $NH_4$, or Na; $R^6$ represents a hydrogen atom, a substitutable alkyl group, a substitutable aryl group, or a substitutable benzoyl group; $R^7$ represents a hydrogen atom or a substitutable alkyl group; $R^8$ represents a hydrogen atom, a halogen atom, or a substitutable alkyl group; $R^9$ represents a hydrogen atom, $NH_4$ which may be substituted, or a substitutable sulfo group; Z represents a chlorine atom, hydroxy group, amino group, monoethanolamino group, diethanolamino group, morpholino group, anilino group, or phenol group in which hydrogen atoms may be substituted by one or more substituents; and A represents an alkylene group, a phenylene-containing alkylene group, or a group represented by the following formula:

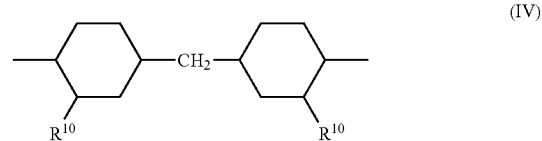

where $R^{10}$ represents a hydrogen atom or an alkyl group.

Preferred examples of the anthrapyridone dye represented by Formula (III) include compounds represented by Formula (III) in which $M^2$ represents $NH_4$ or Na; $R^6$ preferably represents a substitutable benzoyl group and more preferably a benzoyl group substituted by a sulfo group which may be substituted by $NH_4$ or Na; $R^7$ preferably represents a substitutable alkyl group, more preferably an alkyl group containing one to three carbon atoms, and further more preferably a methyl group; $R^8$ represents a hydrogen atom; $R^9$ preferably represents a substitutable sulfo group and more preferably a sulfo group substituted by $NH_4$ or Na; A represents an alkylene group or a group represented by Formula (IV) in which $R^{10}$ represents a hydrogen atom; and Z preferably represents an amino group or a phenol group and more preferably a phenol group represented by a carboxyl group which may be substituted by $NH_4$ or Na.

According to a preferred embodiment of the invention, an ink composition preferably contains an anthrapyridone dye prepared by mixing a compound represented by Formula (III) in which $M^2$ is $NH_4$ and a compound represented by Formula (III) in which $M^2$ is Na. In this ink composition, the content ratio (molar ratio) of the compound represented by Formula (III) in which $M^2$ is $NH_4$ to the compound represented by Formula (III) in which $M^2$ is Na is preferably 6:4 to 8:2 and more preferably 7:3.

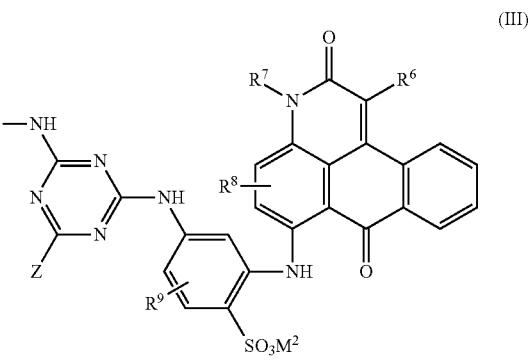

A preferred example of the anthrapyridone dye represented by Formula (I) or (III) is a compound represented by the following formula:

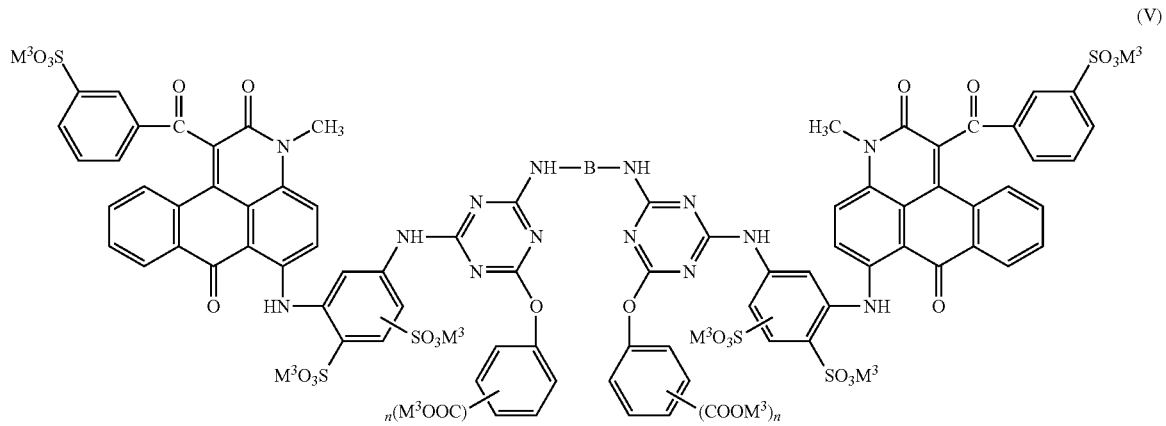

(V)

wherein $M^3$ represents a hydrogen atom, $NH_4$, or Na; B represents an alkylene group; and n represents 1 or 2.

Preferred examples of the anthrapyridone dye represented by Formula (I) or (III) include compounds represented by Formula (V) in which $M^3$ represents $NH_4$ or Na; B preferably represents an alkylene group and more preferably an ethylene group; and n represents 2.

According to a preferred embodiment of the invention, an ink composition preferably contains an anthrapyridone dye prepared by mixing a compound represented by Formula (V) in which $M^3$ is $NH_4$ and a compound represented by Formula (V) in which $M^3$ is Na. In this ink composition, the content ratio (molar ratio) of the compound represented by Formula (V) in which $M^3$ is $NH_4$ to the compound represented by Formula (V) in which $M^3$ is Na is preferably 6:4 to 8:2 and more preferably 7:3.

A preferred example of the anthrapyridone dye represented by Formula (III) is a compound represented by the following formula:

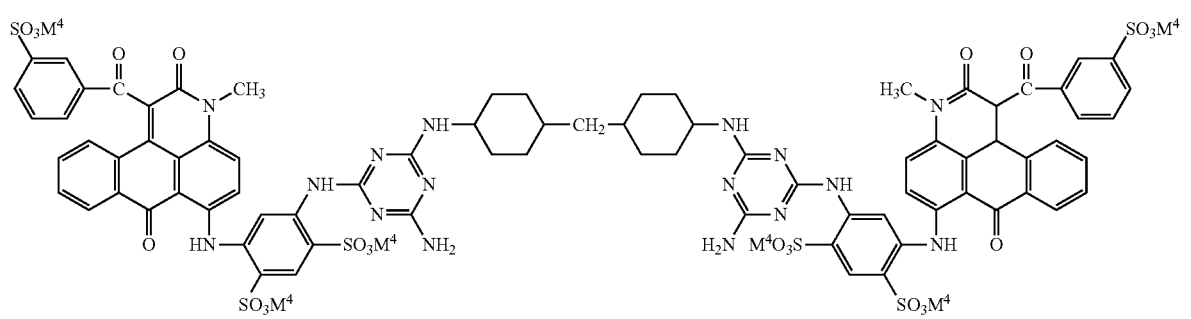

(VI)

wherein $M^4$ represents a hydrogen atom, $NH_4$, or Na.

According to a preferred embodiment of the invention, an ink composition preferably contains an anthrapyridone dye prepared by mixing a compound represented by Formula (VI) in which $M^4$ is $NH_4$ and a compound represented by Formula (VI) in which $M^4$ is Na. In this ink composition, the content ratio (molar ratio) of the compound represented by Formula (VI) in which $M^4$ is $NH_4$ to the compound represented by Formula (VI) in which $M^4$ is Na is preferably 6:4 to 8:2 and more preferably 7:3.

A preferred example of the anthrapyridone dye represented by Formula (V) is a compound represented by the following formula:

(VII)

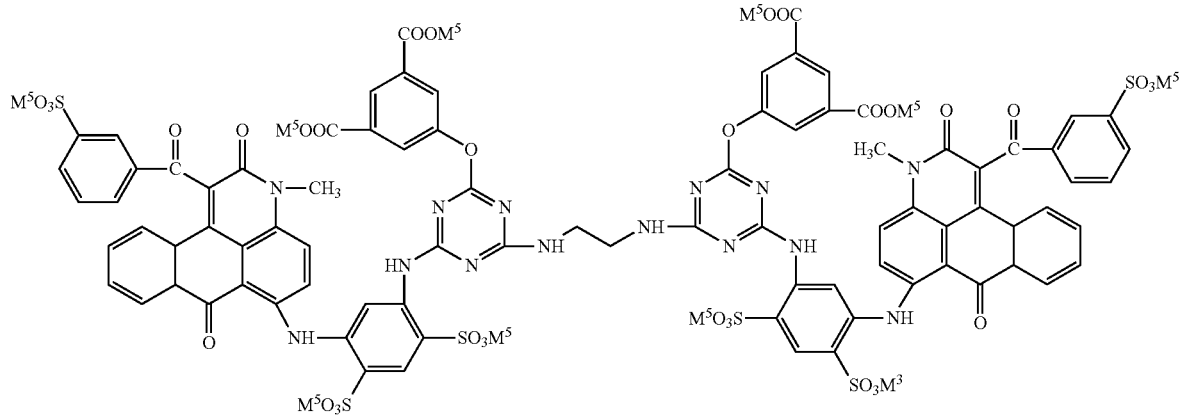

wherein $M^5$ represents a hydrogen atom, $NH_4$, or Na.

According to a preferred embodiment of the invention, an ink composition preferably contains an anthrapyridone dye prepared by mixing a compound represented by Formula (VII) in which $M^5$ is $NH_4$ and a compound represented by Formula (VII) in which $M^5$ is Na. In this ink composition, the content ratio (molar ratio) of the compound represented by Formula (VII) in which $M^5$ is $NH_4$ to the compound represented by Formula (VII) in which $M^5$ is Na is preferably 6:4 to 8:2 and more preferably 7:3.

The content of the anthrapyridone dye in each ink composition is not particularly limited as far as a recorded image with good light fastness can be achieved without impairing the hue of a colorant. The content of the anthrapyridone dye in the ink composition is preferably one to ten mass percent and more preferably five to eight mass percent. This allows a recorded image with a good balance between color developability and light fastness to be achieved.

The content of the anthrapyridone dye in the ink composition is not particularly limited as far as a recorded image with good light fastness can be achieved without impairing the hue of a colorant. The ratio of the content of the anthrapyridone dye to the content of the water-soluble copper compound in the ink composition preferably ranges from 1:1 to 100:1, more preferably 2:1 to 80:1, and further more preferably 3:1 to 32:1. This allows a recorded image with good light fastness to be achieved without impairing the hue of a colorant.

Water-Soluble Copper Compound

The ink composition contains the water-soluble copper compound. The term "water-soluble" as used herein means that the solubility of a compound in water is 0.5 mass percent or more at 25° C.

The water-soluble copper compound used herein is preferably one or more selected from the group consisting of copper (II) chlorate, copper (II) chloride, copper (II) salicylate, copper (II) gluconate, copper (II) formate, disodium copper (II) ethylenediaminetetraacetate, and copper (II) acetate; more preferably one or more selected from the group consisting of copper (II) chloride, copper (II) chlorate, copper (II) gluconate, copper (II) formate, and disodium copper (II) ethylenediaminetetraacetate in view of solubility in ink; and further more preferably copper (II) gluconate and/or disodium copper (II) ethylenediaminetetraacetate in view of safety. Since the ink composition contains the water-soluble copper compound, a recorded image with good light fastness can be achieved without impairing the hue of a colorant.

The content of the water-soluble copper compound in the ink composition is preferably 0.05 to five mass percent and more preferably 0.1 to four mass percent. This allows a recorded image with good light fastness to be achieved without impairing the hue of a colorant.

Water, Water-Soluble Organic Solvent, and Other Optional Components

The ink composition contains an aqueous medium containing water only or water and a water-soluble organic solvent in addition to the anthrapyridone dye, which serves as a colorant, represented by Formula (I) and may further contain a humectant, a surfactant, a penetration enhancer, a viscosity modifier, a pH adjuster, and an additive as required.

The ink composition can be obtained by dissolving the colorant (the anthrapyridone dye) in an appropriate solvent. In the ink composition, a solvent used to dissolve the colorant is preferably water or a mixture of water and the water-soluble organic solvent. Water used to dissolve the colorant may be ion-exchanged water, ultrafiltered water, reverse osmosis-purified water, distilled water, or the like. In view of long-term storage stability, water chemically sterilized water treated by infrared irradiation or with hydrogen peroxide. The content of water in the ink composition is preferably 40 to 90 mass percent and more preferably 50 to 80 mass percent.

The ink composition may contain the water-soluble organic solvent in addition to water as described above. The water-soluble organic solvent preferably has the capability to dissolve the anthrapyridone dye and preferably has a vapor pressure less than that of pure water.

Examples of the water-soluble organic solvent used herein include, but are not limited to, polyols such as ethylene glycol, propylene glycol, butane diol, pentane diol, 2-butene-1,4-diol, 2-methyl-2,4-pentane diol, glycerin, 1,2,6-hexane triol, diethylene glycol, triethylene glycol, and dipropylene glycol; ketones such as acetonylacetone and γ-butyrolactone; esters such as triethyl phosphate; furfuryl alcohol; tetrahydrofurfuryl alcohol; and thiodiglycol. The use of the water-soluble organic solvent in the ink composition together with water allows the stability of the ink composition ejected from ink heads to be increased and also allows the viscosity of the ink composition to be readily reduced or adjusted without varying other properties.

The humectant, which may be contained in the ink composition, is selected from sugars. When the ink composition contains the humectant, the vaporization of water from the ink composition can be prevented and therefore water can be retained in the ink composition in the case of using the ink composition in an ink jet recording method. The sugars usable herein are preferably maltitol, sorbitol, gluconolactone, maltose, and the like. The water-soluble organic solvent acts as a humectant in some cases.

The content of the water-soluble organic solvent and/or humectant in the ink composition is preferably five to 50 mass percent, more preferably five to 30 mass percent, and further more preferably five to 20 mass percent. When the content thereof is five mass percent or more, the ink composition has good water retentivity. When the content thereof is 50 mass percent or less, the viscosity of the ink composition can be adjusted so as to be suitable for an ink jet recording method.

The surfactant, which is contained in the ink composition, is not particularly limited and is preferably nonionic. When the ink composition contains a nonionic surfactant, the ink composition is highly permeable through recording media and can be readily fixed on the recording media during printing. Since a dot recorded on a recording medium with the ink composition is preferably as perfectly round as possible, the presence of the nonionic surfactant in the ink composition provides an advantage that the roundness of an image formed by one dot can be improved and therefore the quality of an obtained image can be improved.

A useful example of the nonionic surfactant is an acetylene glycol surfactant. Examples of the acetylene glycol surfactant include surfactants, Surfynol 465 and Surfynol 104, available from Air Products and Chemicals, Inc. and surfactants, Olfine E1010, Olfine PD001, and Olfine STG, available from Nissin Chemical Industry Co., Ltd. The content of the surfactant in the ink composition is preferably 0.1 to five mass percent and more preferably 0.5 to three mass percent. When the content thereof is 0.1 mass percent or more, the ink composition can achieve sufficient permeability. When the content thereof is five mass percent or less, the blurring of an image is readily prevented.

When the ink composition contains a glycol ether serving as a penetration enhancer in addition to the nonionic surfactant, the ink composition has an increased capability to permeate a recording medium and an extremely clear image can be obtained because ink bleeding (bleeding) is prevented from occurring at boundaries between color inks next to each other during color printing. Therefore, the ink composition preferably contains the penetration enhancer.

Examples of the glycol ether, which is used herein as a penetration enhancer, include, but are not limited to, ethylene glycol monobutyl ether, diethylene glycol monobutyl ether, triethylene glycol monomethyl ether, propylene glycol monomethyl ether, dipropylene glycol monoethyl ether, propylene glycol monobutyl ether, dipropylene glycol monobutyl ether, and triethylene glycol monobutyl ether. The content of the glycol ether in the ink composition is preferably three to 30 mass percent and more preferably five to 15 mass percent. When the content of the glycol ether is three mass percent is three mass percent or more, bleeding can be effectively prevented from occurring between color inks next to each other during color printing. When the content thereof is 30 mass percent or less, the blurring of an image is readily prevented and the ink composition can achieve increased storage stability.

The ink composition may further contain at least one selected from the group consisting of pH adjusters such as triethanolamine and alkali metal hydroxides, water-soluble polymers such as sodium alginate, water-soluble resins, fluorine-containing surfactants, preservatives, fungicides, rust preventives, dissolution aids, oxidation inhibitors, and ultraviolet absorbers. These compounds can be used alone or in combination. These compounds need not be contained in the ink composition if being not necessary. Those skilled in the art can use a preferred amount of a selected preferable additive unless advantages of the invention are reduced. The dissolution aids are a kind of additive that is used to dissolve an insoluble to keep the ink composition uniform if the insoluble precipitates from the ink composition.

Examples of the dissolution aids include, but are not limited to, pyrrolidones such as N-methyl-2-pyrrolidone and 2-pyrrolidone; ureas such as urea, thiourea, and tetramethylurea; allophanates such as allophanate and methyl allophanate; and biurets such as biuret, dimethylbiuret, and tetramethylbiuret. Examples of the oxidation inhibitors include, but are not limited to, L-ascorbic acid and salts thereof.

Examples of the preservatives or the fungicides include, but are not limited to, sodium benzoate, sodium pentachlorophenolate, sodium 2-pyridinethiol-1-oxide, sodium sorbate, sodium dehydroacetate, and 1,2-dibenzothiazoline-3-on (Proxel CRL™, Proxel BDN™, Proxel GXL™, Proxel XL-2™ and Proxel TN™ commercially available from AVECIA).

Examples of the pH adjusters include, but are not limited to, amines such as diethanolamine, triethanolamine, propanolamine, and morpholine; modifications of the amines; metal hydroxides such as potassium hydroxide, sodium hydroxide, and lithium hydroxide; ammonium salts such as ammonium hydroxide and quaternary ammonium salts including tetramethyl ammonium salts; carbonates such as potassium carbonate, sodium carbonate, and lithium carbonate; and phosphates.

The ink composition, which is prepared by mixing some appropriately selected from the above compounds, preferably has a viscosity of less than 10 mPa·s at 20° C. The ink composition preferably has a surface tension of 45 mN/m or less and more preferably 25 mN/m to 45 mN/m at 20° C. The adjustment of the viscosity and surface tension of the ink composition to such values allows the ink composition to have properties suitable for ink jet recording methods. The viscosity and surface tension thereof can be adjusted in such a manner that the amount of a solvent and additives contained in the ink composition is appropriately adjusted and the solvent and the additives are appropriately selected.

The ink composition preferably has a pH of 7.0 to 10.5 and more preferably 7.5 to 10.0 at 20° C. When the ink composition preferably has a pH of 7.0 or more at 20° C., a eutectoid plating can be prevented from being stripped from an ink jet head and the ink composition can be stably ejected from the ink jet head. When the ink composition preferably has a pH of 10.5 or less at 20° C., members in contact with the ink composition, that is, members of the ink jet head and an ink cartridge can be prevented from being deteriorated.

A method for preparing the ink composition includes, but is not limited to, preparing a solution by uniformly dissolving, for example, components of the ink composition in a solvent; pressure-filtering the solution through a membrane filter with a pore size of 0.8 µm; and degassing the solution with a vacuum pump.

EXAMPLES

The invention is further described below in detail. The inventor is not limited to the examples.
Preparation of Ink Composition
An ink composition containing components shown in Tables 1 to 3 were mixed at room temperature for one hour and were then each filtered through a membrane filter with a pore size of 0.8 μm, whereby ink compositions were obtained. Each of values shown in Tables 1 to 3 is the content (mass percent) of a component in a corresponding one of the ink compositions. Compounds A, B, and C are represented by formulas below and are those obtained by mixing a compound in which M in one of the formulas is $NH_4$ and a compound in which M in one of the formulas is Na at a ratio (molar ratio) of 7:3.

Compound A

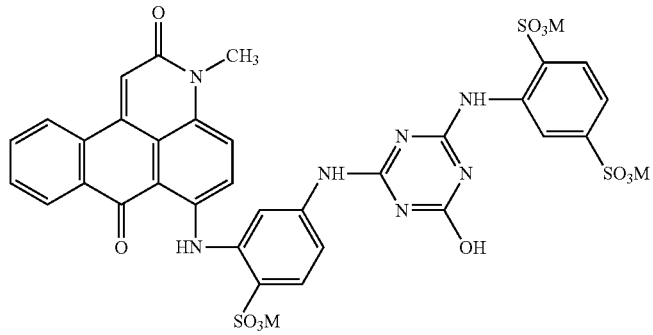

Compound B

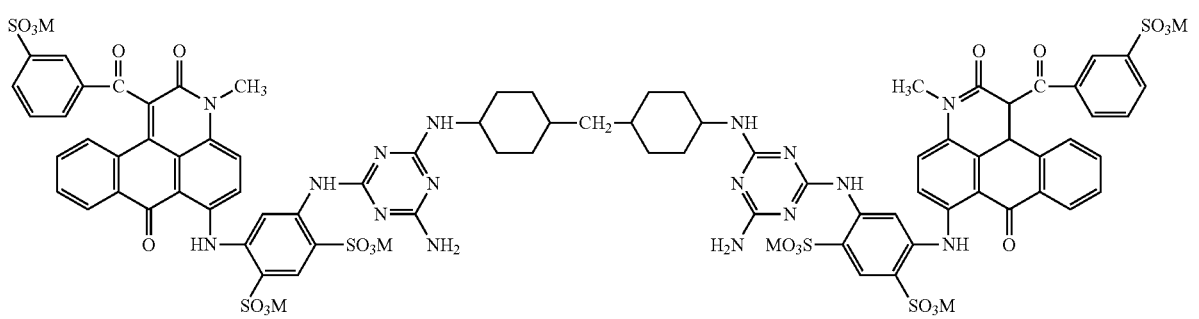

Compound C

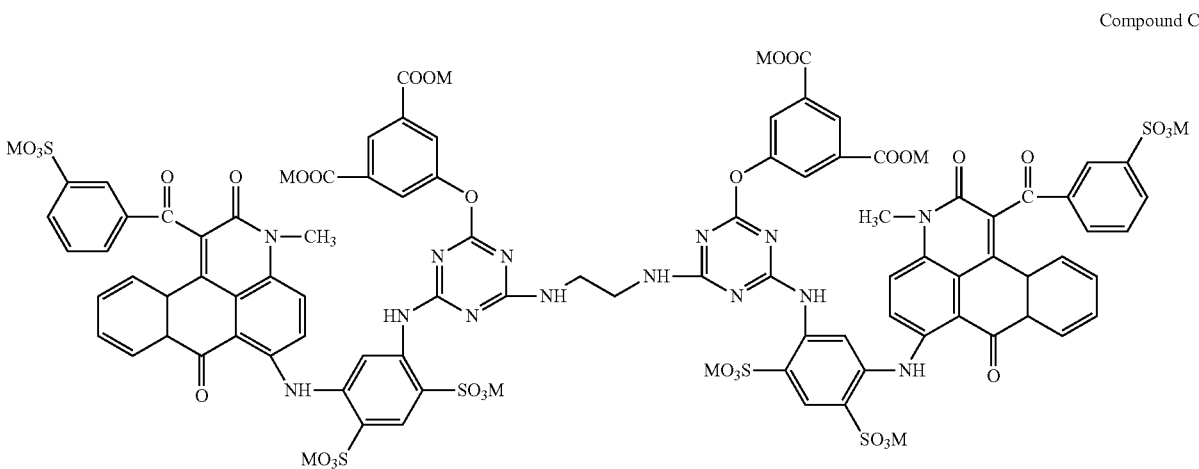

TABLE 1

(unit: mass percent)

| | Example 1 | Example 2 | Example 3 | Example 4 | Example 5 | Example 6 | Example 7 | Example 8 | Example 9 |
|---|---|---|---|---|---|---|---|---|---|
| Magenta Dye 1 (Compound A) | | | | | | | | | 8 |
| Magenta Dye 2 (Compound B) | | | | | | | | 8 | |
| Magenta Dye 3 (Compound C) | 8 | 8 | 8 | 8 | 8 | 8 | 8 | | |
| C.I. Acid Red 52 | | | | | | | | | |
| Copper (II) gluconate | 2 | | | | | | | | 2 |
| Disodium copper (II) ethylenediaminetetraacetate | | | | | | | 2 | 2 | |
| Copper (II) chlorate | | 2 | | | | | | | |
| Copper (II) salicylate | | | 0.5 | | | | | | |

TABLE 1-continued (unit: mass percent)

| | Example 1 | Example 2 | Example 3 | Example 4 | Example 5 | Example 6 | Example 7 | Example 8 | Example 9 |
|---|---|---|---|---|---|---|---|---|---|
| Copper (II) formate | | | | 2 | | | | | |
| Copper (II) acetate | | | | | 0.2 | | | | |
| Copper (II) chloride | | | | | | 2 | | | |
| Sodium gluconate | | | | | | | | | |
| Triethylene glycol monobutyl ether | 10 | 10 | 10 | 10 | 10 | 10 | 10 | 10 | 10 |
| Glycerin | 10 | 10 | 10 | 10 | 10 | 10 | 10 | 10 | 10 |
| Triethylene glycol | 5 | 5 | 10 | 5 | 10 | 10 | 10 | 5 | 5 |
| Triethanol amine | 1 | 1 | 1 | 1 | 1 | 1 | 1 | 1 | 1 |
| Olfine E1010 (*1) | 2 | 2 | 2 | 2 | 2 | 2 | 2 | 2 | 2 |
| Water | Balance | Balance | Balance | Balance | Balance | Balance | Balance | Balance | Balance |
| Total | 100 | 100 | 100 | 100 | 100 | 100 | 100 | 100 | 100 |
| Molar ratio of copper compound (mmol/kg) | 44 | 76 | 18 | 130 | 11 | 149 | 50 | 44 | 50 |
| Content ratio of anthrapyridone dye to copper compound | 4:1 | 4:1 | 16:1 | 4:1 | 40:1 | 4:1 | 4:1 | 4:1 | 4:1 |

((*1): available from Nissin Chemical Industry Co., Ltd)

TABLE 2

(unit: mass percent)

| | Example 10 | Example 11 | Example 12 | Example 13 | Example 14 | Example 15 | Example 16 | Example 17 | Example 18 |
|---|---|---|---|---|---|---|---|---|---|
| Magenta Dye 1 (Compound A) | | | | | | | | | |
| Magenta Dye 2 (Compound B) | | | | | 1 | 5 | 6 | 6 | |
| Magenta Dye 3 (Compound C) | 8 | 10 | 8 | 8 | | | | | 8 |
| C.I. Acid Red 52 | | | | | | | | | |
| Copper (II) gluconate | 0.05 | 0.1 | 0.1 | 0.25 | | | | | |
| Disodium copper (II) ethylenediaminetetraacetate | | | | | 3 | 5 | 3 | 2 | 4 |
| Copper (II) chlorate | | | | | | | | | |
| Copper (II) salicylate | | | | | | | | | |
| Copper (II) formate | | | | | | | | | |
| Copper (II) acetate | | | | | | | | | |
| Copper (II) chloride | | | | | | | | | |
| Sodium gluconate | | | | | | | | | |
| Triethylene glycol monobutyl ether | 10 | 10 | 10 | 10 | 10 | 10 | 10 | 10 | 10 |
| Glycerin | 10 | 10 | 10 | 10 | 10 | 10 | 10 | 10 | 10 |
| Triethylene glycol | 5 | 5 | 5 | 10 | 5 | 5 | 5 | 5 | 5 |
| Triethanol amine | 1 | 1 | 1 | | | | 1 | 1 | 1 |
| Olfine E1010 (*1) | 2 | 2 | 2 | 2 | 2 | 2 | 2 | 2 | 2 |
| Water | Balance | Balance | Balance | Balance | Balance | Balance | Balance | Balance | Balance |
| Total | 100 | 100 | 100 | 100 | 100 | 100 | 100 | 100 | 100 |
| Molar ratio of copper compound (mmol/kg) | 1.1 | 2.2 | 2.2 | 5.5 | 75 | 126 | 75 | 50 | 101 |
| Content ratio of anthrapyridone dye to copper compound | 160:1 | 100:1 | 80:1 | 32:1 | 1:2 | 1:1 | 2:1 | 3:1 | 2:1 |

((*1): available from Nissin Chemical Industry Co., Ltd)

TABLE 3

(unit: mass percent)

| | Example 19 | Example 20 | Example 21 | Example 22 | Example 23 | Example 24 |
|---|---|---|---|---|---|---|
| Magenta Dye 1 (Compound A) | | | 8 | | | |
| Magenta Dye 2 (Compound B) | | 8 | | | | |
| Magenta Dye 3 (Compound C) | 8 | | | | | 8 |
| C.I. Acid Red 52 | | | | 8 | 8 | |
| Copper (II) gluconate | | | | | | |
| Disodium copper (II) ethylenediaminetetraacetate | | | | 2 | | |
| Copper (II) chlorate | | | | | | |
| Copper (II) salicylate | | | | | | |
| Copper (II) formate | | | | | | |
| Copper (II) acetate | | | | | | |
| Copper (II) chloride | | | | | | |

TABLE 3-continued

|  | Example 19 | Example 20 | Example 21 | Example 22 | Example 23 | (unit: mass percent) Example 24 |
|---|---|---|---|---|---|---|
| Sodium gluconate | | | | | | 4 |
| Triethylene glycol monobutyl ether | 10 | 10 | 10 | 10 | 10 | 10 |
| Glycerin | 10 | 10 | 10 | 10 | 10 | 10 |
| Triethylene glycol | 5 | 5 | 5 | 5 | 5 | 5 |
| Triethanol amine | 1 | 1 | 1 | 1 | 1 | 1 |
| Olfine E1010 (*1) | 2 | 2 | 2 | 2 | 2 | 2 |
| Water | Balance | Balance | Balance | Balance | Balance | Balance |
| Total | 100 | 100 | 100 | 100 | 100 | 100 |
| Molar ratio of copper compound (mmol/kg) | — | — | — | 88 | — | — |
| Content ratio of anthrapyridone dye to copper compound | — | — | — | — | — | — |

((*1): available from Nissin Chemical Industry Co., Ltd)

Preparation of Print Samples

Each of ink cartridges filled with the ink compositions (ink compositions prepared in Examples 1 to 24) was installed in a magenta section of an ink jet printer, PM-G800, available from Seiko Epson Corporation and was used to print an image on an evaluation sheet (a sheet of glossy photo paper, Crispia, available from Seiko Epson Corporation). The configuration of a print sample is described below in each test method.

Light Fastness of Images

Solid magenta images were printed in such a manner that applied duty was controlled such that the OD (optical density) of each solid Magenta image was within a range from 0.9 to 1.1, whereby prints were obtained. The prints were exposed to light for 20 days with a xenon weatherometer, XL-75s™, available from Suga Test Instruments Co., Ltd. under the following conditions: a temperature of 23° C., a relative humidity of 50%, and an illuminance of 75,000 lux. The OD of each exposed print was measured with a reflection densitometer, Spectrolino™, available from GretagMacbeth (measurement conditions: a D50 light source, a view angle of two degrees, and DIN-NB). The relict optical density (ROD) of the exposed print was determined by the following equation:

$$ROD(\%) = (D/D_0) \times 100$$

wherein D is the OD of the exposed print and $D_0$ is the OD of the unexposed print.

The prints were evaluated in accordance with standards below.

S: an ROD of 95% or more
A: an ROD of 90% to less than 95%
B: an ROD of 80% to less than 90%
C: an ROD of 70% to less than 80%
D: an ROD of 60% to less than 70%
E: an ROD of less than 60%

The evaluation results are shown in Tables 4 to 6.

Improvement in Light Fastness of Image

An image, formed with one of copper compound-containing ink compositions (Examples 1 to 18 and 22), having light fastness three-rank higher than that of an image formed with one of copper compound-free ink compositions (Examples 19 to 21, 23, and 24) was rated as A, one having light fastness two-rank higher than that was rated as B, one having light fastness one-rank higher than that was rated as C, and one having the same light fastness as that was rated as D. Examples 1 to 7, 10 to 13, 18, and 24 were evaluated using Example 19 as a copper compound-free ink composition. Examples 8 and 14 to 17 were evaluated using Example 20 as a copper compound-free ink composition. Example 9 was evaluated using Example 21 as a copper compound-free ink composition. Example 22 was evaluated using Example 23 as a copper compound-free ink composition. The evaluation results are shown in Tables 4 to 6.

Color Difference of Prints

Solid images were printed at the maximum applied duty, whereby prints were prepared. The prints were dried at 23° C. and a relative humidity of 55% for 24 hours and were then measured for CIE-L*a*b* coordinates with a reflection densitometer, Spectrolino™, available from GretagMacbeth. The color difference (ΔE) between each of the copper compound-free ink compositions (Examples 19 to 21, 23, and 24) and a corresponding one of the copper compound-containing ink compositions (Examples 1 to 18 and 22) was determined by the following equation:

$$\Delta E = \{(L^* - L_0^*)^2 + (a^* - a_0^*)^2 + (b^* - b_0^*)^2\}^{1/2}$$

wherein $L^*$, $a^*$, and $b^*$ are the coordinate values of a copper compound-free ink composition and $L_0^*$, $a_0^*$, $b_0^*$ are the coordinate values of a copper compound-containing ink composition. The relationship between a copper compound-free ink composition and a copper compound-containing ink composition is the same as that described in "Improvement in light fastness of image". Evaluation was performed in accordance with standards below.

S: a ΔE of less than 3
A: a ΔE of 3 to less than 6
B: a ΔE of 6 to less than 10
C: a ΔE of 10 to less than 20
D: a ΔE of 20 or more The evaluation results are shown in Tables 4 to 6.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Light fastness | S | S | S | S | A | S | S | A | B |
| Improvement in light fastness | A | A | A | A | A | A | A | A | A |
| Color difference | S | S | S | S | S | S | S | S | S |

TABLE 5

|  | Example 10 | Example 11 | Example 12 | Example 13 | Example 14 | Example 15 | Example 16 | Example 17 | Example 18 |
|---|---|---|---|---|---|---|---|---|---|
| Light fastness | C | B | A | S | S | S | A | A | S |
| Improvement in light fastness | C | B | A | A | A | A | A | A | A |
| Color difference | S | S | S | S | C | B | A | S | A |

TABLE 6

|  | Example 19 | Example 20 | Example 21 | Example 22 | Example 23 | Example 24 |
|---|---|---|---|---|---|---|
| Light fastness | D | E | E | D | E | D |
| Improvement in light fastness | — | — | — | C | — | D |
| Color difference | — | — | — | S | — | A |

What is claimed is:

1. An ink composition comprising:
a water-soluble copper compound and
an anthrapyridone dye represented by the following formula:

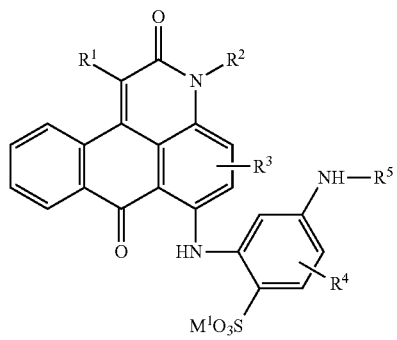

(I)

wherein $M^1$ represents a hydrogen atom, $NH_4$, or Na; $R^1$ represents a hydrogen atom, a substitutable alkyl group, a substitutable aryl group, or a substitutable benzoyl group; $R^2$ represents a hydrogen atom or a substitutable alkyl group; $R^3$ represents a hydrogen atom, a halogen atom, or a substitutable alkyl group; $R^4$ represents a hydrogen atom, $NH_4$ which may be substituted, or a substitutable sulfo group; and $R^5$ represents an acyl group or a group represented by the following formula:

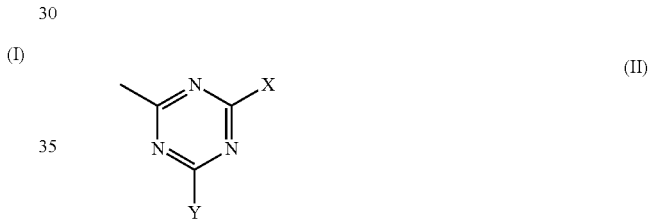

(II)

where X and Y independently represent a chlorine atom, hydroxy group, amino group, monoethanolamino group, diethanolamino group, morpholino group, anilino group, or phenol group in which hydrogen atoms may be substituted by one or more substituents.

2. The ink composition according to claim 1, wherein the anthrapyridone dye is a compound represented by the following formula:

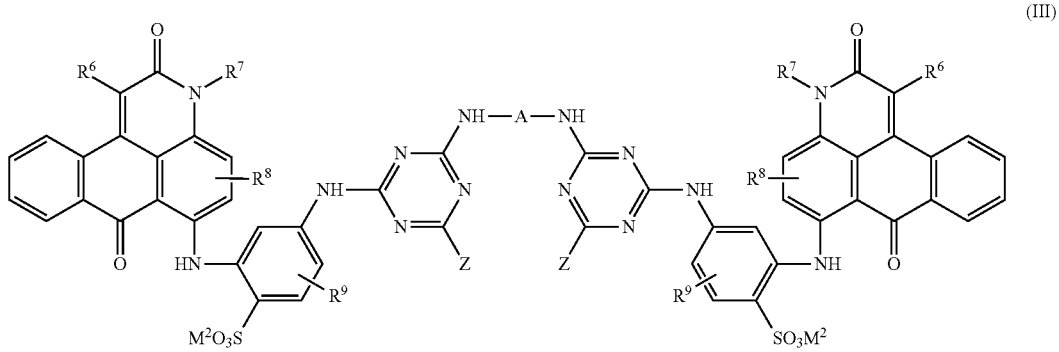

(III)

wherein $M^2$ represents a hydrogen atom, $NH_4$, or Na; $R^6$ represents a hydrogen atom, a substitutable alkyl group, a substitutable aryl group, or a substitutable benzoyl group; $R^7$ represents a hydrogen atom or a substitutable alkyl group; $R^8$ represents a hydrogen atom, a halogen atom, or a substitutable alkyl group; $R^9$ represents a hydrogen atom, $NH_4$ which may be substituted, or a substitutable sulfo group; Z represents a chlorine atom, hydroxy group, amino group, monoethanolamino group, diethanolamino group, morpholino group, anilino group, or phenol group in which hydrogen atoms may be substituted by one or more substituents; and A represents an alkylene group, a phenylene-containing alkylene group, or a group represented by the following formula:

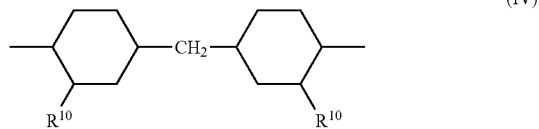

(IV)

where $R^{10}$ represents a hydrogen atom or an alkyl group.

3. The ink composition according to claim 1, wherein the anthrapyridone dye is a compound represented by the following formula:

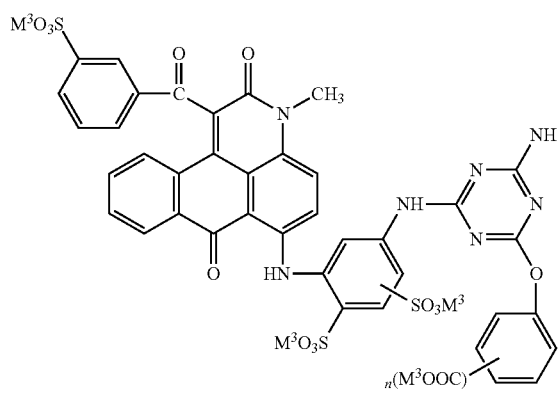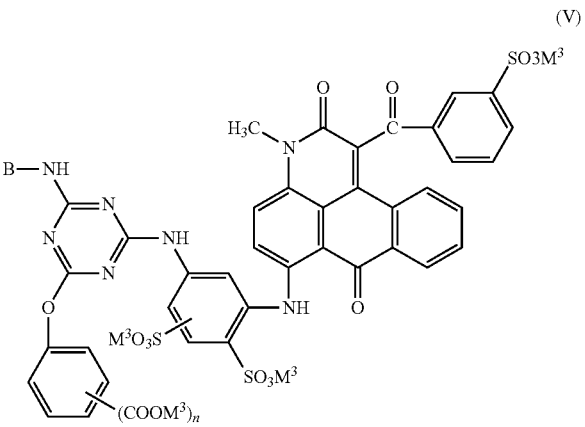

(V)

wherein $M^3$ represents a hydrogen atom, $NH_4$, or Na; B represents an alkylene group; and n represents 1 or 2.

4. The ink composition according to claim 1, wherein the water-soluble copper compound is one or more selected from the group consisting of copper (II) chlorate, copper (II) chloride, copper (II) salicylate, copper (II) gluconate, copper (II) formate, disodium copper (II) ethylenediaminetetraacetate, and copper (II) acetate.

5. The ink composition according to claim 1, wherein the water-soluble copper compound is one or more selected from the group consisting of copper (II) chloride, copper (II) chlorate, copper (II) gluconate, copper (II) formate, and disodium copper (II) ethylenediaminetetraacetate.

6. The ink composition according to claim 1, wherein the water-soluble copper compound is copper (II) gluconate.

7. The ink composition according to claim 1, wherein the water-soluble copper compound is disodium copper (II) ethylenediaminetetraacetate.

8. The ink composition according to claim 1, wherein the ratio of the content of the anthrapyridone dye and the content of the water-soluble copper compound ranges from 1:1 to 100:1.

9. The ink composition according to claim 1, wherein the content of the water-soluble copper compound in the ink composition is 0.05 to five mass percent.

10. The ink composition according to claim 1, wherein the content of the anthrapyridone dye in the ink composition is one to ten mass percent.

* * * * *